United States Patent
Schneider

[11] Patent Number: 6,165,558
[45] Date of Patent: *Dec. 26, 2000

[54] STORAGE-STABLE MOULDING POWDER BASED ON EPOXY RESINS

[75] Inventor: Hildegard Schneider, Steinen, Germany

[73] Assignee: Vantico, Inc., Brewster, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/101,789

[22] PCT Filed: Jan. 23, 1997

[86] PCT No.: PCT/EP97/00297

§ 371 Date: Jul. 16, 1998

§ 102(e) Date: Jul. 16, 1998

[87] PCT Pub. No.: WO97/28203

PCT Pub. Date: Aug. 7, 1997

[30] Foreign Application Priority Data

Feb. 2, 1996 [CH] Switzerland ............... 277/96

[51] Int. Cl.⁷ ............... B05D 3/02
[52] U.S. Cl. ............... 427/386; 523/446; 523/427; 525/523; 525/526; 525/934
[58] Field of Search ............... 427/386; 523/446, 523/427; 525/523, 526, 934

[56] References Cited

U.S. PATENT DOCUMENTS

| | | | |
|---|---|---|---|
| 3,288,747 | 11/1966 | Sussman | 260/37 |
| 4,022,946 | 5/1977 | Cummings et al. | 427/386 |
| 4,175,173 | 11/1979 | Bagga et al. | 528/97 |
| 4,421,897 | 12/1983 | Gutekunst et al. | 525/119 |
| 4,526,940 | 7/1985 | Seymour et al. | 525/526 |
| 4,637,954 | 1/1987 | Ohsumi | 428/342 |
| 4,977,214 | 12/1990 | Bagga | 525/109 |
| 5,387,442 | 2/1995 | Kroeger et al. | 427/521 |
| 5,686,185 | 11/1997 | Correll et al. | 428/418 |
| 5,714,206 | 2/1998 | Daly et al. | 427/475 |
| 5,721,052 | 2/1998 | Muthiah et al. | 48/413 |
| 5,907,020 | 5/1999 | Correll et al. | 525/526 |

FOREIGN PATENT DOCUMENTS

| | | |
|---|---|---|
| 0042759 | 12/1981 | European Pat. Off. |
| 1009478 | 11/1965 | United Kingdom |
| 1033514 | 6/1966 | United Kingdom |

*Primary Examiner*—Margaret G. Moore
*Attorney, Agent, or Firm*—Michele A. Kovaleski

[57] ABSTRACT

A moulding powder which is curable with the application of heat and pressure, comprising a mechanical mixture consisting of: a) a powdered epoxy compound containing on average more than one epoxy group in the molecule and having a softening point of above 60° C., b) a powdered aliphatic or N-heterocyclic amine or a powdered amino group-containing adduct based on an aliphatic, cycloaliphatic, araliphatic or N-heterocyclic amine containing on average more than one amino group in the molecule and having a melting point or softening point of above 60° C. and, optionally, c) customary additives for moulding powders, the particles of a) and b) being smaller than 200 μm, is excellently suited for the preparation of coatings on heat-sensitive substrates and is used in particular in powder coating.

7 Claims, No Drawings

STORAGE-STABLE MOULDING POWDER BASED ON EPOXY RESINS

The present invention relates to a storage-stable highly reactive moulding powder based on epoxy resins and aminic hardeners and to the use of said moulding powder for the preparation of moulded articles or coatings, preferably for powder coatings.

Until now, the customary method of preparing powder coatings based on epoxy resins was that using extruders. As is described, inter alia, by Becker/Braun in "Kunststoffhandbuch" (Carl Hanser Verlag München Wien 1988), Vol. 10, Chapter 13.10 under powder coatings on pages 1047–1058 and, in particular, on pages 1051 and 1052, said preparation is carried out such that the individual components such as epoxy resin, hardener and the customary additives for powder coatings, typically flow control agents, pigments, fillers and catalysts, are comminuted, mixed and then extruded in the temperature range from 70 to 120° C. depending on the composition of the mixture and the type of extruders used. The temperature must be such that no pre-crosslinking occurs interfering with the subsequent processing. After extruding, the extrudate is cooled and ground to a particle size of smaller than 100 $\mu$m. In contradistinction to a mechanical mixture, the particles so obtained therefore contain all components combined. The application to the substrate to be coated is carried out by known methods, typically by electrostatic powder spraying or by fluidised-bed coating. The applied powder coating is then cured in the temperature range from about 130 to 240° C. for 10 to 30 minutes. Disadvantages of powder coatings having low curing temperatures, e.g. 130° C., are the relatively long curing times of over 15 minutes, the poor flow of the powder coating on the substrate as well as the limited storage stability of the formulated powder coatings.

EP-Patent 0 042 759 discloses a process for colouring a substrate surface by powder coating, which comprises using powder coating systems which are curable with the application of heat and pressure. The dislosed coating powders consisting of epoxy resin and polyester, or of epoxy resin and polyurethane, are cured at 180° C. in 3 or 10 minutes, respectively, and are poorly suited for coating substrates susceptible to heat, such as paperboard or wood, and are not reactive enough for curing at low temperatures.

JP Application Kokai Sho 61-107980 discloses a process for coating wood, wherein the substrate consisting of wood is first coated with a liquid epoxy resin and then with an epoxy resin in powder form before the coating is cured with the application of heat and pressure. The liquid as well as the solid epoxy resin contain a catalytic hardener, e.g. 2-ethyl-4-methylimidazole, so that the storage stability of the coating systems used is low.

It has now been found that storage-stable coating powders based on epoxy resins and aminic hardeners, which are rapidly curable with the application of heat and pressure, are obtained if a powdered epoxy resin having a particle size smaller than 200 $\mu$m and a softening point (according to DIN 51920) of above 60° C. is mechanically mixed with a powdered aliphatic or N-heterocyclic amine or a powdered amino group-containing adduct based on an aliphatic, cycloaliphatic, araliphatic or N-heterocyclic amine having a particle size of smaller than 200 $\mu$m and a softening point of above 60° C. without extrusion, giving a physical mixture of the components.

Accordingly, the invention relates to a moulding powder which is curable with the application of heat and pressure, comprising a mechanical mixture consisting of a) a powdered epoxy compound containing on average more than one epoxy group in the molecule and having a softening point of above 60° C.,
b) a powdered aliphatic or N-heterocyclic amine or a powdered amino group-containing adduct based on an aliphatic, cycloaliphatic, araliphatic or N-heterocyclic amine containing on average more than one amino group in the molecule and having a melting point or softening point of above 60° C. and, optionally,
c) customary additives for moulding powders, the particles of a) and b) being smaller than 200 um.

Suitable powdered epoxy compunds a) are all solid epoxy resins customary in epoxy resin technology having a softening point of above 60° C. Such epoxy resins are known, inter alia, from DE-OS 28 38 841 and U.S. Pat. No. 4,175,173, and some are commercially available.

Component a) is preferably an aromatic epoxy resin, typically the polyglycidyl ethers of polyphenols, preferably of bisphenols, or a N-heterocyclic epoxy resin, such as the diglycidyl compound of hydantoins or the triglycidyl compound of cyanuric acid.

The epoxy resins which are preferably used have an epoxy content of 0.5 to 12 equivalents per kg. Those epoxy resins having a softening point of below 60° C. can be converted in known manner into higher molecular weight epoxy resins having higher softening points by advancement, typically by reaction with a substoichiometric amount of a divalent phenol.

Epoxy resins which are particularly preferred have a softening point of above 80° C. and are optionally advanced polyglycidyl ethers of 2,2-bis(4'-hydroxyphenyl)propane (bisphenol A), of 2,2-bis(3',5'-dibromo-4'-hydroxyphenyl) propane (tetrabromobisphenol A), of bis(4-hydroxypehnyl) methane (bisphenol F) and of novolaks, polyglycidyl derivatives of 4,4'-diaminodiphenylmethane, of 4,4'-diamonodiphenylsulfone as well as of hydantoins and of 2,4,6-trihydroxy-1,3,5-triazine (cyanuric acid), typically triglycidyl isocyanurate.

For the preparation of the novel moulding powders it is preferred to use the polyglycidyl compounds of bisphenol A, tetrabromobisphenol A, bisphenol F or of a novolak such as phenol novolak or cresol novolak, or triglycidyl isocyanurate. It is also possible to use mixtures of said polyglycidyl compounds.

The aliphatic or N-heterocyclic amines having a melting point of above 60° C. which are used as component b) in the novel moulding powders are also known compounds and include mono-, di- and polyamines. Said compounds can be piperazine, 1,10-diaminodecane, 1,12-diaminododecane.

The amino group-containing adducts present in the novel moulding powders, which are obtained in known manner by reacting a diepoxy compound with a diamine or polyamine in excess of stoichiometric proportion, are preferably those derived from diglycidyl ethers, typically from bisphenol diglycidyl ethers. Aliphatic di- or polyamines used for the preparation of the amino group-containing adducts are typically ethylenediamine, diethylenetriamine, triethylenetetramine, tetraethylenepentamine, propane-1,2-diamine, propane-1,3-diamine, hexamethylene-1,6-diamine, dipropylenetriamine or 2,2,4-trimethylhexane-1,6-diamine. Arylaliphatic diamine can typically be 1,4-bis (aminomethyl)benzene. Suitable cycloaliphatic diamines are typically bis(aminomethyl)cyclohexane, bis(4-aminocyclohexyl)methane, bis(4-aminocyclohexyl)sulfone, bis(4-aminomethyl)dicyclopentadiene, 2,2-bis(4-aminocyclohexyl)propane, bis(4-amino-3-methylcyclohexyl)methane, 2,2-bis(4-amino-3- methylcyclohexyl) propane, 1,4-diaminocyclohexane, 1,2-diaminocyclohexane, 1,3-diamino-4-methylcyclohexane or 3-aminomethyl-3,5,5-trimethylcyclohexylamine (isophoronediamine). N-heterocyclic di- or polyamines can typically be piperazine, N-2-amino-ethylpiperazine or 4-amino-2,2,6,6-tetramethylpiperidine.

Component b) in the novel moulding powders is preferably an aliphatic amine or an amino group-containing adduct.

Component b) in the novel moulding powders is preferably an amino group-containing adduct, particularly preferably of a diglycidyl ether compound of bisphenol A and ethylenediamine, diethylenetriamine, 1,2- or 1,4-diaminocyclohexane or isophoronediamine.

Components a) and b) in the novel moulding powders are usually used in approximately equivalent amounts, i.e. 0.75 to 1.25 equivalents of active hydrogen bound to amino nitrogen atoms of component b) per epoxy equivalent of component a).

The novel moulding powders can also contain in the customary fillers and reinforcing materials of epoxy technology. Suitable fillers are for example: mineralic and fibrous fillers such as quartz powder, fused silica, aluminium oxide, glass powder, mica, kaolin, dolomite, graphite, carbon black as well as carbon fibres and textile fibres. Preferred fillers are quartz powder, fused silica, aluminium oxide or dolomite. Suitable reinforcing materials are typically glass fibres or carbon fibres, fibres of natural materials such as wood or jute, or wood chips.

The moulding powders of this invention are preferably used as powder coatings. In the case of this preferred application, it is possible to add the customary additives of the paint industry to the novel powder coatings, typically light stabilisers, colourants and, in particular, degassing agents, flow control agents or pigments such as, preferably, $TiO_2$.

Flow control agents are typically polyacetals, such as polyvinylbutyral (Movital® B 30H, supplied by Hoechst), polyethylene glycol, polyvinylpyrrolidone, glycerol, acrylic copolymers such as Modaflow® or Acrylron® MFP, supplied by Monsanto and Protex, respectively. The degassing agent is preferabyl benzoin.

The novel moulding powders can be prepared by either milling components a) and b) separately to particles having a particle size of <200 µm, removing those particles having a particle size of >200 µm by sieving, and then mixing the powdered components a) and b) mechanically in a mixing unit such that a physical mixture is obtained, or by mixing components a) and b) mechanically before grinding and sieving them together.

The components can be mixed using customary laboratory mixers, typically in a ball mill, in a laboratory multipurpose mixer or in a Rhoenrad mixer.

The additives c) can be added during the preparation of the novel moulding powder to component a) or component b) as well as to both components before or after grinding and sieving.

Where a pigment is used as additive, it is preferably added to component a) and/or b) before grinding, and the mixture of component a) and pigment or of component b) and pigment is extruded, e.g. in a Buss ko-kneader. The ground and sieved extrudate of component a) or component b) is then used to prepared the physical mixture.

The novel moulding powders can be used for the preparation of moulded articles and coatings, the curing of the moulding powders being carried out with the application of heat and pressure. The novel moulding powders are preferably used for the preparation of chip boards.

The moulded articles prepared from the novel moulding powders preferably contain fillers or reinforcing agents. The novel moulding powders are preferably used to prepare chip boards or moulded parts by mixing or impregnating wood chips or fibres of natural materials with the novel moulding powders and moulding them with the application of heat in a moulding press to chip boards or moulded parts. Accordingly, the invention also relates to the moulded articles prepared from the novel moulding powders, in particular chip boards or moulded parts.

The novel moulding powders are preferably used as coating powders, in particular for coating heat-sensitive substrates such as paper, paperboard, wood, thermoplasts or duroplasts because the novel moulding powders are highly reactive and have the advantage of curing rapidly under pressure and heat. Accordingly, this invention also relates to powder coatings consisting of the novel moulding powders.

The coatings are prepared by applying the novel powder to the substrate by sieving, sprinkling or by electrostatic powder spraying. The surface of the substrate coated with the powder coating is then covered with a heat-resistant foil, or an antisize is applied to the moulding press. The powder coating is crosslinked in a heatable moulding press under slight pressure. Independently of the layer thickness of the powder coating applied, crosslinking times of less than 3 minutes are usually required at a temperature of about 130° C. and a pressure of about 10 $N/cm^2$.

For electrostatic powder spraying it is preferred to use moulding powders having a particle size of <100 µm.

If desired, a heatable roll or a heatable metal band can be used for curing the powder coating, which would also make a continuous coating process possible.

In another of its aspects, this invention relates to the coatings prepared from the novel moulding powders.

As mentioned at the outset, the novel moulding powders are distinguished by being, on the one hand, highly reactive, while having a long storage stability at room temperature or up to 40° C. The moulded articles and coatings prepared from the novel moulding powders have excellent mechanical properties and the coatings have very good adhesive strength on the substrates.

The following compounds are used in the Examples:

Epoxy resin A: Mixture of 80 g of diglycidyl ether of bisphenol A and 20 g of phenol novolak epoxy resin having an epoxy content of 1.9 equivalents/kg and a softening point according to DIN 51920 of 95° C.

Epoxy resin B: Diglycidyl ether of bispheol A having an epoxy content of 1.7 equivalents/kg and a softening point according to DIN 51920 of 80–90° C.

Epoxy resin C: Cresol novolak epoxy resin having an epoxy content of 4.5 equivalents/kg and a softening point according to DIN 51920 of 94° C.

Hardener I: Amino group-containing adduct, having an amine content of 3.5 equivalents/kg and a softening point according to DIN 51920 of 94° C., which is obtainable by reacting 1000 g of diglycidyl ether resin of bisphenol A having an epoxy content of 2.1 equivalents/kg with 485 g of ethylenediamine in an inert organic solvent with subsequent removal of the solvent and excess amine by distillation.

Hardener II: Amino group-containing adduct, having an amine content of 3.5 equivalents/kg and a softening point according to DIN 51920 of 100° C., which is obtained by reacting 1000 g of diglycidyl ether resin of bisphenol A having an epoxy content of 2.1 equivalents/ kg with 1400 g of 1,2-diaminocyclohexane in an inert organic solvent with subsequent removal of the solvent and excess amine by distillation.

EXAMPLE 1

Epoxy resin A and hardener I are ground separately by known standard methods to a fine powder, the coarse components having a particle size of more than 100 µm being removed with a sieve. 735 g of powdered epoxy resin A are physically mixed with 265 g of powdered hardener I in a laboratory mixer (type: Rhoenrad mixer). The gelling time of the ready-to-use powder at 130° C. is 21 seconds (sec). There is no significant change in the gelling time after storing the powder mixture for 6 months at 40° C.

The powder mixture is applied to a wood surface (beech), previously moistened with water, by electrostatic powder spraying. The wood surface coated with the powder coating is covered with a heat-resistant foil (Tedlar®, producer: DuPont). The powder coating is crosslinked in a moulding press heated to 130° C. for 2 min, 30 sec at a pressure of about 10 N/cm$^2$.

A coating film is obtained having the following properties:

film thickness: about 50 µm.

flow (visual assessment): very good (film surface is not veined).

impact strength*, front side (20 cm•kg): very good (coating does not chip).

cross-hatch adhesion: very good (coating does not chip off the wood).

*) From the front, a 1 kg punch is dropped onto the coated wood part from a height of 20 cm.

EXAMPLE 2

530 g of epoxy resin B are homogenised with 470 g of titanium dioxide in an extruder (type: ko-kneader, supplied by Buss, Prattein, CH) at 75° C. Extrudate and hardener are ground separately by known standard methods to a fine powder. The coarse components having a particle size of more than 100 µm are removed with a sieve.

1000 g of powdered extrudate are physically mixed with 175 g of powdered hardener I in a laboratory mixer (type: Rhoenrad mixer). The gelling time of the ready-to-use powder at 130° .C is 35 sec. The powder mixture is sieved onto a MDF board (MDF=Medium Density Fibreboard, a compressed fibre board of medium density consisting of wood particles and duroplastic binders), and the wood surface coated with the powder coating is covered with a Tedlar® foil. The powder coating is crosslinked in a moulding press heated to 130° C. for 2 min 30 sec at a pressure of about 10 N/cm$^2$.

A coating film is obtained having the following properties:

film thickness: about 60 µm flow (visual assessment): very good (film surface is not veined)

impact strength according to Example 1, on the front side (20 cm•kg): very good (coating does not chip)

cross-hatch adhesion: very good (coating does not chip off the wood)

EXAMPLE 3

In exactly the same manner as in Example 1, a coating powder is prepared by mixing 223 g of epoxy resin C and 192 g of hardener 1. The gelling time of the ready-to-use powder at 130° C. is 17 sec. The powder mixture is sieved onto beech and covered with a Tedlar® foil. The powder coating is crosslinked in a moulding press heated to 130° C. for 90 sec under a slight pressure of 10 N/cm$^2$.

The coating film so obtained has the following properties:

film thickness: about 130 µm flow (visual assessment): very good (film surface is not veined)

impact strength according to Example 1, front side (20 cm•kg): very good (coating does not chip)

acetone test *): not scratchable

*) A cotton swab drenched with acetone is placed on the coated surface for 1 min. Subsequently it is tested whether the coated surface can be scratched with a finger nail.

EXAMPLE 4

In exactly the same manner as in Example 1, a coating powder is prepared by mixing 534 g of epoxy resin C and 455 g of hardener II. The gelling time of the ready-to-use powder at 130° C. is 34 sec. The powder mixture is sieved onto beech and covered with a Tedlar® foil. The powder coating is crosslinked in a moulding press heated to 130° C. for 3 min at a pressure of about 10 N/cm$^2$.

A coating film is obtained having the following properties:

film thickness: about 170 µm flow (visual assessment): very good (film surface is not veined)

impact strength according to Example 1, front side (20 cm•kg): very good (coating does not chip)

acetone test according to Example 3: not scratchable

EXAMPLE 5

Epoxy resin A and hardener I are ground separately by known standard methods to fine powders, the coarse components of over 100 µm being removed with a sieve. The powders are further processed as follows:

735 g of powdered epoxy resin A are physically mixed with 265 g of powdered hardener I in a laboratory mixer. The gelling time of the ready-to-use powder at 130° C. is 21 sec. To prepare chip boards, 834 g of wood chips having a water content of about 7% by weight are mixed with 68.2 g of the ready-to-use powder for 20 minutes in a laboratory mixer. Subsequently, 798 g of this powder mixture are sprinkled into a square wooden mould having an inner surface area of 625 cm$^2$ and are precompressed with a punch to a square moulded article. Upon removal of the wooden mould, the precompressed moulded article is automatically compressed and fully cured in a moulding press supplied by Bucher Guyer AG, type KHE 50-40-40, for 12 minutes at a press temperature of 160° C. The chip board so obtained has a thickness of 20 mm.

The transverse tensile strength according to DIN 52 365 was tested in 5 samples of the chip board, giving an average value of 0.42 N/mm$^2$.

What is claimed is:

1. A process for producing a coating on a heat-sensitive substrate selected from paper, paperboards, wood, chip boards, medium-density fiberboards (MDF-boards), thermoplasts, duroplasts or moulded parts, by using a powder coating composition comprising a mechanical mixture consisting of
   a) a powdered epoxy compound containing on average more than one epoxy group in the molecule and having a softening point of above 60° C.;
   b) a powdered aliphatic amine or a powdered amino group-containing adduct based on an aliphatic, cycloaliphatic, araliphatic or N-heterocyclic amine, said adduct containing on average more than one amino group in the molecule, which amine or adduct has a melting point or softening point of above 60° C.; and, optionally, c) customary additives for moulding powders, wherein the particles of a) and b) are smaller than 200 μm and wherein components a) and b) are used in amounts of from 0.75 to 1.25 equivalents of active hydrogen bound to amino nitrogen atoms of component b) per epoxy equivalent of component a), whereby said composition is applied on a heat-sensitive substrate and cured with the application of heat and pressure.

2. A process according to claim 1, wherein a composition is used, wherein component a) is an aromatic or N-heterocyclic epoxy resin.

3. A process according to claim 1, wherein a composition is used, wherein component a) is a bisphenol diglycidyl ether or a triglycidyl isocyanurate.

4. A process according to claim 1, wherein a composition is used, wherein component a) is a polyglycidyl ether of bisphenol A, tetrabromobisphenol A, bisphenol F or of a novolak, or triglycidyl isocyanurate.

5. A process according to claim 1, wherein a composition is used, wherein component b) is an amino group-containing adduct.

6. A process according to claim 1, wherein a composition is used, wherein component b) is an amino group-containing adduct of a diglycidyl ether compound of bisphenol A and ethylenediamine, diethylenetriamine, 1,2- or 1,4-diaminocyclohexane or isophoronediamine.

7. A process according to claim 1, wherein a composition is used, comprising as reinforcing material wood chips or fibres of natural materials.

* * * * *